United States Patent
Yu et al.

(10) Patent No.: US 9,130,456 B2
(45) Date of Patent: Sep. 8, 2015

(54) CONTROL CIRCUIT OF INTERLEAVED SWITCHING POWER SUPPLY AND CONTROL METHOD THEREOF

(71) Applicant: Silergy Semiconductor Technology (Hangzhou) LTD, Hangzhou, ZheJiang Province (CN)

(72) Inventors: Feng Yu, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/485,977

(22) Filed: Sep. 15, 2014

(65) Prior Publication Data

US 2015/0077072 A1    Mar. 19, 2015

(30) Foreign Application Priority Data

Sep. 16, 2013 (CN) .......................... 2013 1 0422771

(51) Int. Cl.
*G05F 1/00* (2006.01)
*H02M 3/158* (2006.01)
*H02M 1/00* (2007.01)

(52) U.S. Cl.
CPC ...... *H02M 3/158* (2013.01); *H02M 2001/0009* (2013.01); *H02M 2003/1586* (2013.01)

(58) Field of Classification Search
CPC .............................. H02M 3/156; H02M 3/158
USPC ......... 323/207, 222, 272, 282–285, 288, 351, 323/901
See application file for complete search history.

(56) References Cited

U.S. PATENT DOCUMENTS

| | | | |
|---|---|---|---|
| 7,012,411 B2 | 3/2006 | Yasukouchi | |
| 8,587,968 B2 | 11/2013 | Zhu et al. | |
| 8,729,819 B2 | 5/2014 | Zhao et al. | |
| 2002/0140407 A1* | 10/2002 | Hwang | 323/207 |
| 2013/0148387 A1 | 6/2013 | Ren et al. | |
| 2014/0159689 A1* | 6/2014 | Chen | 323/282 |

FOREIGN PATENT DOCUMENTS

CN           102707757 A      10/2012

* cited by examiner

*Primary Examiner* — Adolf Berhane
*Assistant Examiner* — Afework Demisse
(74) *Attorney, Agent, or Firm* — Michael C. Stephens, Jr.

(57) ABSTRACT

In one embodiment, a control circuit configured for an interleaved switching power supply, can include: (i) a feedback compensation signal generation circuit configured to sample an output voltage of the interleaved switching power supply, and to generate a feedback compensation signal; (ii) a first switch control circuit configured to compare a first branch voltage signal that represents an inductor current of a first voltage regulation circuit against the feedback compensation signal, where when the first branch voltage signal is consistent with the feedback compensation signal, a first switch on signal is generated to control a first main power switch of the first voltage regulation circuit to be on for a predetermined time, and then off; and (iii) a second switch control circuit configured to compare a second branch voltage signal that represents an inductor current of a second voltage regulation circuit against the feedback compensation signal.

12 Claims, 4 Drawing Sheets

CONTROL CIRCUIT OF INTERLEAVED SWITCHING POWER SUPPLY AND CONTROL METHOD THEREOF

RELATED APPLICATIONS

This application claims the benefit of Chinese Patent Application No. 201310422771.5, filed on Sep. 16, 2013, which is incorporated herein by reference in its entirety.

FIELD OF THE INVENTION

The present invention relates to a switch mode power supply, and more particularly to a control circuit of an interleaved switching power supply, and an associated control method.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a control circuit configured for an interleaved switching power supply, can include: (i) a feedback compensation signal generation circuit configured to sample an output voltage of the interleaved switching power supply, and to generate a feedback compensation signal; (ii) a first switch control circuit configured to compare a first branch voltage signal that represents an inductor current of a first voltage regulation circuit against the feedback compensation signal, where when the first branch voltage signal is consistent with the feedback compensation signal, a first switch on signal is generated to control a first main power switch of the first voltage regulation circuit to be on for a predetermined time, and then the first main power switch is controlled to be off; and (iii) a second switch control circuit configured to compare a second branch voltage signal that represents an inductor current of a second voltage regulation circuit against the feedback compensation signal, where when the second branch voltage signal is consistent with the feedback compensation signal, a second switch on signal is generated to control a second main power switch of the second voltage regulation circuit to be on, and where the second switch control circuit is configured to detect a phase difference between the first and second switch on signals, and to adjust an on time of the second main power switch to regulate the phase difference to be 180° in response to the phase difference being detected as other than 180°.

In one embodiment, a method of controlling an interleaved switching power supply, can include: (i) sampling an output voltage of the interleaved switching power supply, and generating a feedback compensation signal; (ii) comparing a voltage signal representing an inductor current of a first voltage regulation circuit against the feedback compensation signal, and comparing a voltage signal representing an inductor current of a second voltage regulation circuit against the feedback compensation signal; (iii) generating a first switch on signal to turn on a main power switch of the first voltage regulation circuit when the voltage signal representing the inductor current of the first voltage regulation circuit is consistent with the feedback compensation signal, and generating a second switch on signal to turn on a main power switch of the second voltage regulation circuit when the voltage signal representing the inductor current of the second voltage regulation circuit is consistent with the feedback compensation signal; (iv) controlling the main power switch of the first voltage regulation circuit to be on for a predetermined time and then turning off the main power switch of the first voltage regulation circuit; and (v) adjusting an on time of the main power switch of the second voltage regulation circuit to regulate a phase difference between the first and second switch on signals to be 180° in response to the phase difference being detected as other than 180°.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
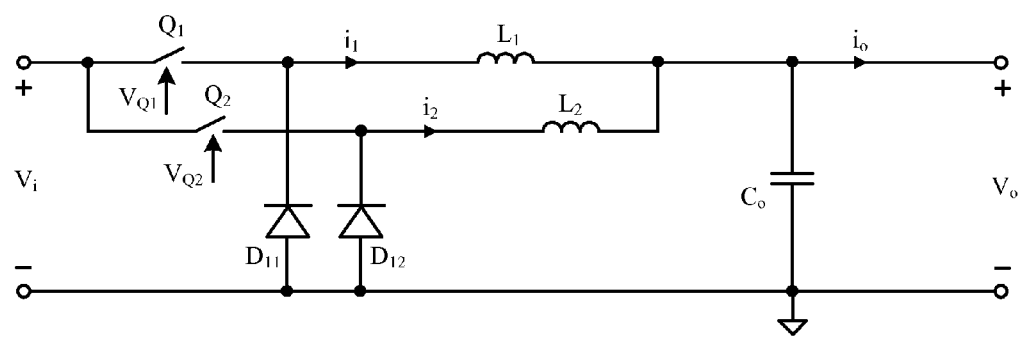
FIG. 1 is a schematic block diagram of an example interleaved switching power supply.

Main circuits of a switching power supply can be coupled in an "interleaved" fashion, and in parallel to decrease the burden of the power switches, to improve the power density of the power supply, and to decrease the ripple of the output voltage of the switching power supply in order to maintain a higher quality of output voltage. FIG. 1 shows an example of an interleaved switching power supply. In this example, the main circuit configuration can include two phase buck circuits coupled interleaved and in parallel, and the interleaved switching power supply can include a first voltage regulator, a second voltage regulator, and an output capacitor $C_o$. The first voltage regulator can include main power switch (e.g., a power transistor) $Q_1$, inductor $L_1$, and free-wheeling diode $D_{11}$. The second voltage regulator can include main power switch (e.g., a power transistor) $Q_2$, inductor $L_2$, and free-wheeling diode $D_{12}$. Main power switches $Q_1$ and $Q_2$ can connect to the positive electrode of input supply $V_i$, and to inductors $L_1$ and $L_2$, respectively.

Other terminals of inductor $L_1$ and inductor $L_2$ can connect to each other. For example, a first terminal of free-wheeling diode $D_{11}$ can connect to a second terminal of main power switch $Q_1$. A first terminal of free-wheeling diode $D_{12}$ can connect to a second terminal of main power switch $Q_2$. The second terminals of free-wheeling diodes $D_{11}$ and $D_{12}$ can both connect to the negative electrode of input supply $V_i$. Output capacitor $C_o$ can connect to the second terminals of inductor $L_1$ and inductor $L_2$, and to ground. The positive electrode and negative electrode of output capacitor $C_o$ can be configured as the positive electrode and negative electrode of the output terminals of the interleaved switching power supply.

In operation of the interleaved switching power supply, the conduction phase of main power switch $Q_2$ may lag that of main power switch $Q_1$ by about 180°. Thus, currents and $i_2$ can be generated, and ripple waves of current $i_1$ and $i_2$ can be counteracted to decrease the current ripple of output current $i_o$. However, the frequency may be increased by, e.g., two times the original frequency, and the voltage ripple of output voltage $V_o$ may also be decreased. Therefore, the values of inductor $L_1$, inductor $L_2$, and output capacitor $C_o$ can be decreased to improve the dynamic response. For example, each buck circuit may only afford half of the output power, and current flowing through inductors $L_1$ and $L_2$, and power switches $Q_1$ and $Q_2$ may be only half of that of regular buck circuit. Also, in high frequency working conditions, ceramic capacitors of lower equivalent resistance can be utilized as output capacitor $C_o$ to maintain the output of the switching power supply as steadier and with higher efficiency.

The phase difference control of the interleaved switching power supply can be achieved when a constant frequency control is employed. For typical switching power supplies, better dynamic response performance and simplified compensation design can be achieved by constant time control mode. However, when the constant on time control mode is used in interleaved switching power supplies, the interleaved parallel control of the two voltage regulators may be difficult to achieve due to the variable operation frequency.

In particular embodiments, a control circuit and a control method may be applied in an interleaved switching power supply. Also, a feedback compensation signal generation circuit may be employed to obtain output voltage information at the output terminals of the interleaved switching power supply, to generate a feedback compensation signal (e.g., by compensation and/or calculating). The branch voltage signals of the two voltage regulation circuits can be compared against the feedback compensation signal by a switch control circuitry, and the phase difference between the two branch voltage signals may be detected. When the branch voltage signal is consistent with (e.g., the same or substantially the same value as) the feedback compensation signal, the corresponding main power switch of the two voltage regulation circuits can be turned on, and the on time can be controlled. When the phase difference is other than 180° (e.g., greater than a predetermined phase amount away from 180°), the on time of the main power switch may be correspondingly increased or decreased to regulate the phase difference to be about 180°. In this fashion, a constant on time control mode may be applied in an interleaved switching power supply.

In one embodiment, a control circuit configured for an interleaved switching power supply, can include: (i) a feedback compensation signal generation circuit configured to sample an output voltage of the interleaved switching power supply, and to generate a feedback compensation signal; (ii) a first switch control circuit configured to compare a first branch voltage signal that represents an inductor current of a first voltage regulation circuit against the feedback compensation signal, where when the first branch voltage signal is consistent with the feedback compensation signal, a first switch on signal is generated to control a first main power switch of the first voltage regulation circuit to be on for a predetermined time, and then the first main power switch is controlled to be off; and (iii) a second switch control circuit configured to compare a second branch voltage signal that represents an inductor current of a second voltage regulation circuit against the feedback compensation signal, where when the second branch voltage signal is consistent with the feedback compensation signal, a second switch on signal is generated to control a second main power switch of the second voltage regulation circuit to be on, and where the second switch control circuit is configured to detect a phase difference between the first and second switch on signals, and to adjust an on time of the second main power switch to regulate the phase difference to be 180° in response to the phase difference being detected as other than 180°.

Figure 2:
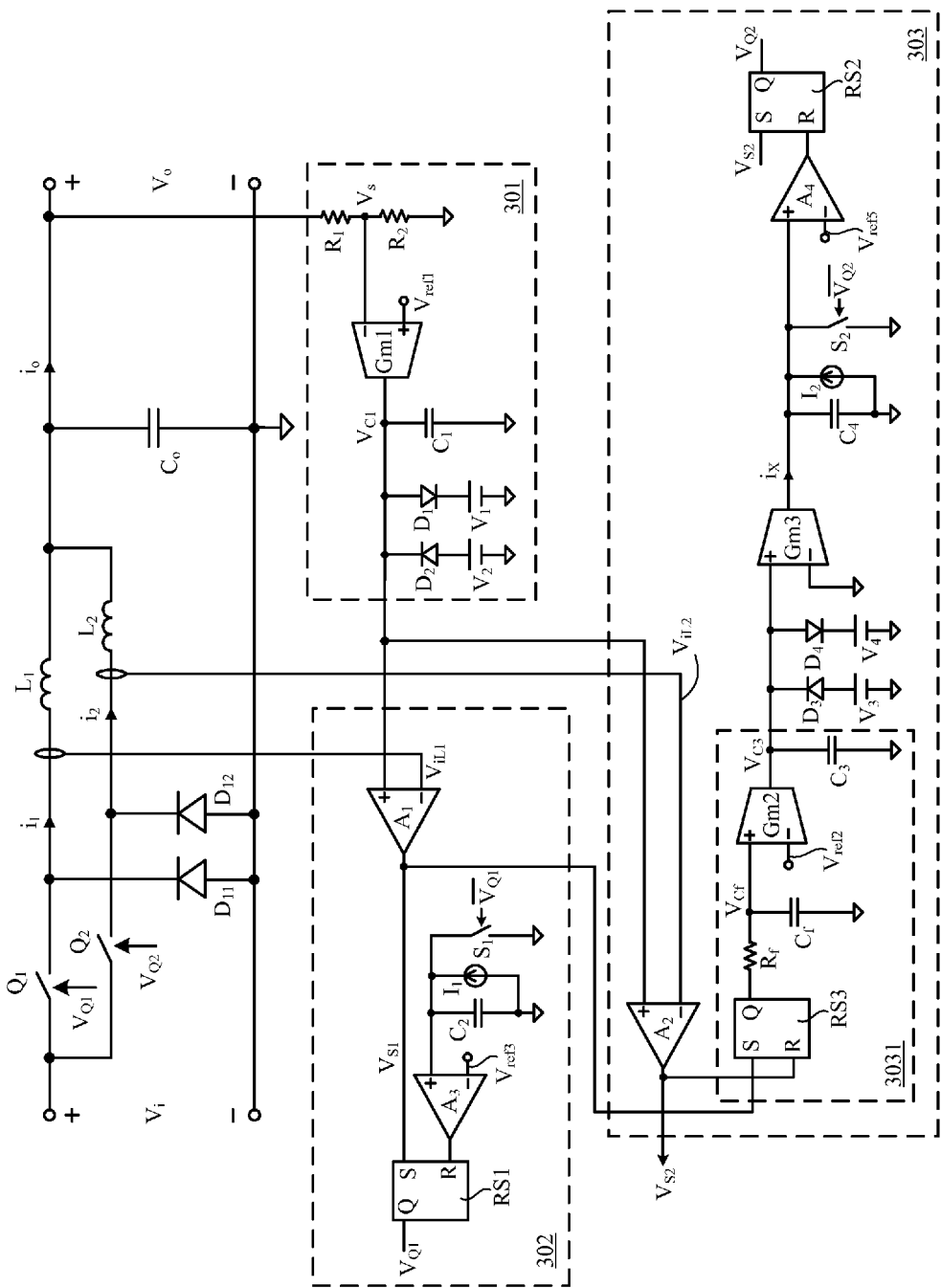
FIG. 2 is a schematic block diagram of a first example control circuit of an interleaved switching power supply, in accordance with embodiments of the present invention.

Referring now to FIG. 2, shown is a schematic block diagram of a first example control circuit of an interleaved switching power supply, in accordance with embodiments of the present invention. This example interleaved switching power supply can include a first voltage regulator and a second voltage regulator coupled in parallel, and both may be buck topology circuits. However, the voltage regulators can be any suitable topology (e.g., boosts, flyback, SEPIC, Zeta, etc.) in particular embodiments. Further, a voltage regulator can increase or decrease a voltage of input supply $V_i$ at the input terminals of the interleaved switching power supply to generate a DC supply voltage of higher quality at the output terminals.

This example control circuit can include feedback compensation signal generation circuit 301, which can sample output voltage $V_o$ at the output terminals of the interleaved switching power supply to generate feedback compensation signal $V_{C1}$ (e.g., by calculating and/or compensating). Switch control circuit 302 can receive a voltage signal (e.g., branch voltage signal $V_{iL1}$) representing the inductor current of the first voltage regulator. Branch voltage signal $V_{iL1}$ may be compared against feedback compensation signal $V_{C1}$. When branch voltage signal $V_{iL1}$ is consistent with (e.g., the same or substantially the same value as) feedback compensation signal $V_{C1}$, main power switch $Q_1$ of the first voltage regulator may be controlled to be on for a predetermined time by switch control circuit 302, and then main power switch $Q_1$ can be turned off.

Switch control circuit 303 can receive a voltage signal (e.g., branch voltage signal $V_{iL2}$) representing the inductor current of the second voltage regulator. Branch voltage signal $V_{iL2}$ may be compared against feedback compensation signal $V_{C1}$. When branch voltage signal $V_{iL2}$ is consistent with feedback compensation signal $V_{C1}$, main power switch $Q_2$ of the first voltage regulator may be turned on. In addition, the phase difference between the on signal of main power switch $Q_1$ (e.g., $V_{S1}$) and that of main power switch $Q_2$ (e.g., $V_{S2}$) may be detected. For example, if this phase difference is greater than a predetermined amount away from 180°, the on time of main power switch $Q_2$ may be increased or decreased, and then main power switch $Q_2$ may be turned off. After several such regulations of the on time of main power switch $Q_2$, the phase difference can be regulated to be about 180°.

Switch control circuit 302 can include comparator $A_1$, flip-flop RS1, and a first off signal generation circuit. The non-inverting input terminal of comparator $A_1$ can receive feedback compensation signal $V_{C1}$, and the inverting input terminal of comparator $A_1$ can receive branch voltage signal $V_{iL1}$ of the first voltage regulation circuit. Switch on signal $V_{S1}$ may be generated at the output terminals of comparator $A_1$, and may be provided to the set terminal (S) of RS flip-flop RS1. The first off signal generation circuit can receive control signal (e.g., $V_{Q1}$) of main power switch $Q_1$. When $V_{Q1}$ is active (e.g., logic high), the first off signal generation circuit begin operation. After the predetermined time, a first switch off signal may be provided to the reset terminal (R) of RS flip-flop RS1 to control the on time of main power switch $Q_1$ to be substantially the predetermined time.

The output terminal (Q) of flip-flop RS1 can generate $V_{Q1}$. When the first switch on signal is active, flip-flop RS1 may be set, and hence the control signal of main power switch $Q_1$ therefrom may be active to control main power switch $Q_1$ to be on. When the first switch off signal is inactive, flip-flop RS1 may be reset, and hence the control signal of main power switch $Q_1$ therefrom may be inactive to control main power switch $Q_1$ to be off. Further, the first off signal generation circuit can include comparator $A_3$, capacitor $C_2$, current source $I_1$, and switch $S_1$. Switch $S_1$, current source $I_1$ and capacitor $C_2$ can be coupled in parallel, and a first common node of which can connect to the non-inverting input terminal of comparator $A_3$, while a second common mode of which can connect to ground. Operation of switch $S_1$ may be controlled by the control signal of main power switch $Q_1$. When the control signal of main power switch $Q_1$ is active, main power switch $Q_1$ may be turned on, and capacitor $C_1$ may be charged by current source $I_1$. When the control signal of main power switch $Q_1$ is inactive, main power switch $Q_1$ may be turned off, and the voltage of capacitor $C_1$ may be discharged to ground.

The inverting input terminal of comparator $A_3$ can receive reference voltage $V_{ref3}$. When the voltage across capacitor $C_2$ is charged to be consistent with reference voltage $V_{ref3}$, the first switch off signal may be activated at the output of comparator $A_3$. Furthermore, switch control circuit 303 can include comparator $A_2$, flip-flop RS2, a second off signal generation circuit, transconductance operational amplifier Gm3, and phase difference judging circuit 3031. The inverting input terminal of comparator $A_2$ can receive branch voltage signal $V_{iL2}$ representing the inductor current of the second voltage regulation circuit, and the non-inverting input terminal can receive feedback compensation signal $V_{C1}$. Second switch on signal $V_{S2}$ may be generated at the output terminal by comparing branch voltage signal $V_{iL2}$ with feedback compensation signal $V_{C1}$, which can connect to the set terminal of flip-flop RS2.

Phase difference judging circuit 3031 can receive the first switch on signal (e.g., $V_{S1}$) and the second switch on signal (e.g., $V_{S2}$) to determine the phase difference between the two signals, and to generate a voltage signal (e.g., $V_{C3}$) representing the phase difference, which may be then be provided to the non-inverting input terminal of transconductance operational amplifier Gm3. The inverting input terminal of transconductance operational amplifier Gm3 can connect to ground. A current signal $i_x$, which may be positive or negative, may be generated in accordance with $V_{C3}$ by transconductance operational amplifier Gm3.

The second off signal generation circuit can receive current signal $i_x$, and the control signal of main power switch $Q_2$ (e.g., $V_{Q2}$). When the control signal of main power switch $Q_2$ is active, the time of generation of the second switch off signal, which may be provided to the reset terminal of flip-flop RS2 by the second off signal generation circuit, may be regulated by the current signal $i_x$ to regulate the on time of main power switch $Q_2$. The output terminal of flip-flop RS2 can generate the control signal of main power switch $Q_2$. When the second switch on signal is active, flip-flop RS2 may be set to make the control signal of main power switch $Q_2$ active to control main power switch $Q_2$ to be on. When the second switch on signal is inactive, flip-flop RS2 may be reset to make the control signal of main power switch $Q_2$ inactive to control main power switch $Q_2$ to be off.

For example, the second off signal generation circuit can include switch $S_2$, current source $I_2$, capacitor $C_4$ and comparator $A_4$. Switch $S_2$, current source $I_2$, and capacitor $C_4$ can be coupled in parallel, the first common node of which can connect to the non-inverting input terminal of comparator $A_4$, and the second common node of which can connect to ground. The operation of switch $S_2$ may be controlled by the control signal of main power switch $Q_2$. When the control signal of switch $S_2$ is active, $S_2$ may be turned on, and capacitor $C_4$ may be charged by current source $I_2$ and current signal $i_x$. When the control signal of main power switch $S_2$ is inactive, switch $S_2$ may be turned off, and the voltage across capacitor $C_4$ may be discharged to ground. Also, the inverting input terminal of comparator $A_4$ can receive reference voltage $V_{ref5}$. When the voltage across capacitor $C_4$ is charged to be consistent with reference voltage $V_{ref5}$, the second switch off signal may be generated at the output terminal of comparator $A_4$.

For example, phase difference judging circuit 3031 can include flip-flop RS3, a low-pass filter, transconductance operational amplifier Gm2, and compensation capacitor $C_3$. The set terminal of flip-flop RS3 can receive the first switch on signal, the reset terminal can receive the second switch on signal, and the output can generate a square wave signal representing the phase difference between the first and second switch on signals. The low-pass filter can convert the square wave signal to a voltage signal representing the phase difference between the first and second switch on signals. Transconductance operational amplifier Gm2 can receive the voltage signal (e.g., $V_{Cf}$) at its non-inverting input terminal, and reference voltage $V_{ref2}$ at its inverting input terminal. For example, the value of reference voltage $V_{ref2}$ may be set as the half of the amplitude of the square wave signal.

Compensation capacitor $C_3$ may be coupled between the output terminal of transconductance operational amplifier Gm2 and ground. When $V_{Cf}$ is greater than reference voltage $V_{ref2}$, the voltage of compensation capacitor $C_3$ may be increased to represent that the phase difference between the first and second switch on signals is greater than 180°. When $V_{Cf}$ is less than reference voltage $V_{ref2}$, the voltage of compensation capacitor $C_3$ may be decreased to represent that the phase difference between the first and second switch on signals is less than 180°. The low-pass filter can include filtering capacitor $C_f$ and filtering resistor $R_f$. One terminal of filtering resistor $R_f$ can connect to the output terminal of flip-flop RS3, and the other terminal can connect to the non-inverting input terminal of transconductance operational amplifier Gm2. Filtering capacitor $C_f$ can connect to filtering resistor $R_f$, and to ground.

Switch control circuit 303 can include an upper clamping circuit and a lower clamping circuit, which can both be coupled to the non-inverting input terminal of transconductance operational amplifier Gm3. Therefore, the phase difference between branch voltage signals $V_{iL1}$ and $V_{iL2}$ of the two voltage regulation circuits may not be substantially far away from 180°. Further, the lower clamping circuit can include diode $D_3$ and supply $V_3$ coupled in series. The anode of diode $D_3$ can connect to the non-inverting input terminal of transconductance operational amplifier Gm3, and the cathode of which can connect to the anode of supply $V_3$. The cathode of supply $V_3$ can connect to ground. The voltage may be clamped below $U_{V3}-U_{D3}$ by the lower clamping circuit.

The upper clamping circuit can include diode $D_4$ and supply $V_4$ coupled in series. The cathode of diode $D_4$ can connect to the non-inverting input terminal of transconductance operational amplifier Gm3, the anode of which can connect to the anode of supply $V_3$. The cathode of supply $V_4$ can connect to ground. The voltage may be clamped above $U_{V4}+U_{D4}$ by the upper clamping circuit. In this particular example, the capacitance of capacitors $C_1$ and $C_4$ may be substantially identical, the output current of current sources $I_1$ and $I_2$ may be substantially identical, and the value of reference voltages $V_{ref3}$ and $V_{ref5}$ may be substantially identical. Therefore, the on time of main power switches $Q_1$ and $Q_2$ may be substantially identical, and the phase difference between main power switches $Q_1$ and $Q_2$ may be about 180° to achieve interleaved control.

Feedback compensation signal generation circuit 301 can include transconductance operational amplifier Gm1, compensation capacitor $C_1$, sampling resistor $R_1$, and sampling resistor $R_2$. One terminal of sampling resistor $R_1$ can connect to an anode of the output terminals of the interleaved switching power supply, and the other terminal can connect to the inverting input terminal of transconductance operational amplifier Gm1. One terminal of sampling resistor $R_2$ can connect to the inverting input terminal of transconductance operational amplifier Gm1, and the other terminal can connect to ground. The non-inverting input terminal of transconductance operational amplifier Gm1 can receive reference voltage $V_{ref1}$. The current at the output terminal of transconductance operational amplifier Gm1 may be compensated by compensation capacitor $C_1$ to generate feedback compensation signal $V_{C1}$.

Feedback compensation signal generation circuit 301 can also include an upper clamping circuit and a lower clamping circuit, which can be both coupled to the output terminal of transconductance operational amplifier Gm1 to control a fluctuation range of feedback compensation signal $V_{C1}$. Further, the upper clamping circuit can include diode $D_1$ and supply $V_1$ coupled in series. The anode of diode $D_1$ can connect to the output terminal of transconductance operational amplifier Gm1, and the cathode of diode $D_1$ can connect to the anode of supply $V_1$. The cathode of supply $V_1$ can connect to ground. Also, the voltage of feedback compensation signal $V_{C1}$ may be clamped below $U_{V1}+U_{D1}$ by the upper clamping circuit.

For example, the lower clamping circuit can include diode $D_2$ and supply $V_2$ coupled in series. The cathode of diode $D_2$ can connect to the output terminal of transconductance operational amplifier Gm1, and the anode of diode $D_2$ can connect to the anode of supply $V_2$. The cathode of supply $V_2$ can connect to ground. Also, the voltage of feedback compensation signal $V_{C1}$ may be clamped above $U_{V2}-U_{D2}$ by the lower clamping circuit. Further, the interleaved switching power supply can include a first voltage regulation circuit, a second voltage regulation circuit, and output capacitor $C_o$. The first voltage regulation circuit can include main power switch $Q_1$, inductor $L_1$, and free-wheeling diode $D_{11}$. The second voltage regulation circuit can include main power switch $Q_2$, inductor $L_2$, and free-wheeling diode $D_{12}$. Terminals of main power switches $Q_1$ and $Q_2$ can be both coupled to the anode of input supply $V_i$. A second terminal of main power switch $Q_1$ can connect to a first terminal of inductor $L_1$, and a second terminal of main power switch $Q_2$ can connect to a first terminal of inductor $L_2$. A second terminal of inductor $L_1$ can connect to a second terminal of inductor $L_2$.

A first terminal of free-wheeling diode $D_{11}$ can connect to a second terminal of main power switch $Q_1$. A first terminal of free-wheeling diode $D_{12}$ can connect to a second terminal of main power switch $Q_2$. Second terminals of both free-wheeling diode $D_{11}$ and free-wheeling diode $D_{12}$ can connect a cathode of input supply $V_i$. The anode of output capacitor $C_o$ can connect to second terminals of inductors $L_1$ and $L_2$, and the cathode can connect to input supply $V_i$ and to ground. The anode of output capacitor $C_o$ may be configured as the anode of the output terminals of the interleaved switching power supply, and the cathode of output capacitor $C_o$ may be configured as the cathode of the output terminals.

Feedback compensation signal generation circuit 301 can receive feedback signal $V_s$ of output voltage $V_o$, which may be then be calculated and compensated by transconductance operational amplifier Gm1 and compensation capacitor $C_1$, to generate feedback compensation signal $V_{C1}$. Comparator $A_1$ of switch control circuit 302 can receive feedback compensation signal $V_{C1}$ and branch voltage signal $V_{iL1}$ representing the inductor current of the first voltage regulation circuit. When the valley (e.g., low point, range, or local minima) of branch voltage signal $V_{iL1}$ reaches a level of feedback compensation signal $V_{C1}$, output signal $V_s$ of comparator $A_1$ may go high, and output signal $V_{Q1}$ of flip-flop RS1 may thus go high to turn on main power switch $Q_1$ of the first voltage regulation circuit. Also, switch $S_1$ may be turned off by an inverted version of signal $V_{Q1}$.

Capacitor $C_2$ may be charged by current source $I_1$. When the voltage across capacitor $C_2$ reaches a level of reference voltage $V_{ref3}$, the output signal of comparator $A_3$ may be high to reset flip-flop RS1. Output signal $V_{Q1}$ may go low to control main power switch $Q_1$ of the first voltage regulation circuit to be off. Therefore, the on time of main power switch $Q_1$ of the first voltage regulation circuit may be determined by the value of current source $I_1$, capacitor $C_2$, and reference voltage $V_{ref3}$. The on time of main power switch $Q_1$ may be fixed when the value of current source $I_1$, capacitor $C_2$, and reference voltage $V_{ref3}$ is substantially constant. Comparator $A_2$ of switch control circuit 303 can receive feedback compensation signal $V_{C1}$ and branch voltage signal $V_{iL2}$ representing the inductor current of the second voltage regulation circuit. When the valley of branch voltage signal $V_{iL2}$ reaches a level of feedback compensation signal $V_{C1}$, output signal $V_{S2}$ of comparator $A_2$ may go high, and output signal $V_{Q2}$ of flip-flop RS2 may thus go high to turn on main power switch Q2 of the second voltage regulation circuit.

Flip-flop RS1 can receive signals $V_{S1}$ and $V_{S2}$, and may generate a square wave signal representing a phase difference between signals $V_{S1}$ and $V_{S2}$, which may be then be filtered by a low-pass filter including resistor $R_f$ and capacitor $C_f$ to generate voltage signal $V_{Cf}$ in direct proportion with the phase difference between signals $V_{S1}$ and $V_{S2}$. Transconductance operational amplifier Gm2 can receive voltage signal $V_{Cf}$ at the non-inverting input terminal, and reference voltage $V_{ref2}$, which may be half of the peak value of the square wave signal, at the inverting input terminal. Whether the phase difference between signals $V_{S1}$ and $V_{S2}$ is about 180° can be determined by comparing voltage signal $V_{Cf}$ with reference voltage $V_{ref2}$. The output signal of transconductance operational amplifier Gm2 may be compensated by compensation capacitor $C_3$ to generate voltage signal $V_{C3}$, which may be then be compared with zero by transconductance operational amplifier Gm3 to generate current signal $i_x$ to represent whether the phase difference between signals $V_{S1}$ and $V_{S2}$ is about 180°.

When the phase difference between signals $V_{S1}$ and $V_{S2}$ is about 180°, the phase difference between signals $V_{iL1}$ and $V_{iL2}$ may be about 180° in a steady state, and current signal $i_x$ may be zero. Therefore, in steady state, if the value of capacitor $C_2$ is consistent with that of capacitor $C_4$, the value of current $I_1$ is consistent with that of current $I_2$, and the value of voltage $V_{ref3}$ is consistent with that of voltage $V_{ref5}$ the on time of main power switches $Q_1$ and $Q_2$ may be substantially identical. Also, the phase difference between the control signals of main power switches $Q_1$ and $Q_2$ may be about 180°, in order to achieve the interleaved control mode.

When the phase difference between signals $V_{S1}$ and $V_{S2}$ is greater than 180°, current signal $i_x$ may flow from the output terminal of transconductance operational amplifier Gm3. Switch $S_2$ may be turned off because an inverted version of control signal $V_{Q2}$ of switch $S_2$ may be low. Capacitor $C_4$ may be charged by current source $I_2$ together with current signal $i_x$. The charge of capacitor $C_4$ may be accelerated in order to decrease the time that capacitor $C_4$ is charged to a level of reference voltage $V_{ref5}$. An output of comparator $A_4$ may be advanced to be converted to high to reset flip-flop RS2. Thus, signal $V_{Q2}$ can go low to turn off main power switch Q2 of the second voltage regulation circuit in advance. The phase difference between signals $V_{iL1}$ and $V_{iL2}$ may thus be forced to be regulated to about 180° to achieve interleaved control mode.

Similarly, when the phase difference between signals $V_{S1}$ and $V_{S2}$ is less than 180°, current signal $i_x$ may flow into the output terminal of transconductance operational amplifier Gm3. Switch $S_2$ may be turned off because an inverted version of control signal $V_{Q2}$ of switch $S_2$ is low. Capacitor $C_4$ may be charged by current source $I_2$ minus current signal $i_x$. The charge of capacitor $C_4$ may be decreased in order to increase the time that capacitor $C_4$ is charged to a level of reference $V_{ref5}$. The output of comparator $A_4$ may be delayed to be converted to high to reset flip-flop RS2. Thus, signal $V_{Q2}$ may be delayed to go low to turn off main power switch $Q_2$ of the second voltage regulation circuit. The phase difference between signals $V_{iL1}$ and $V_{iL2}$ may thus be forced to be regulated to about 180° to achieve interleaved control mode.

Figure 3:
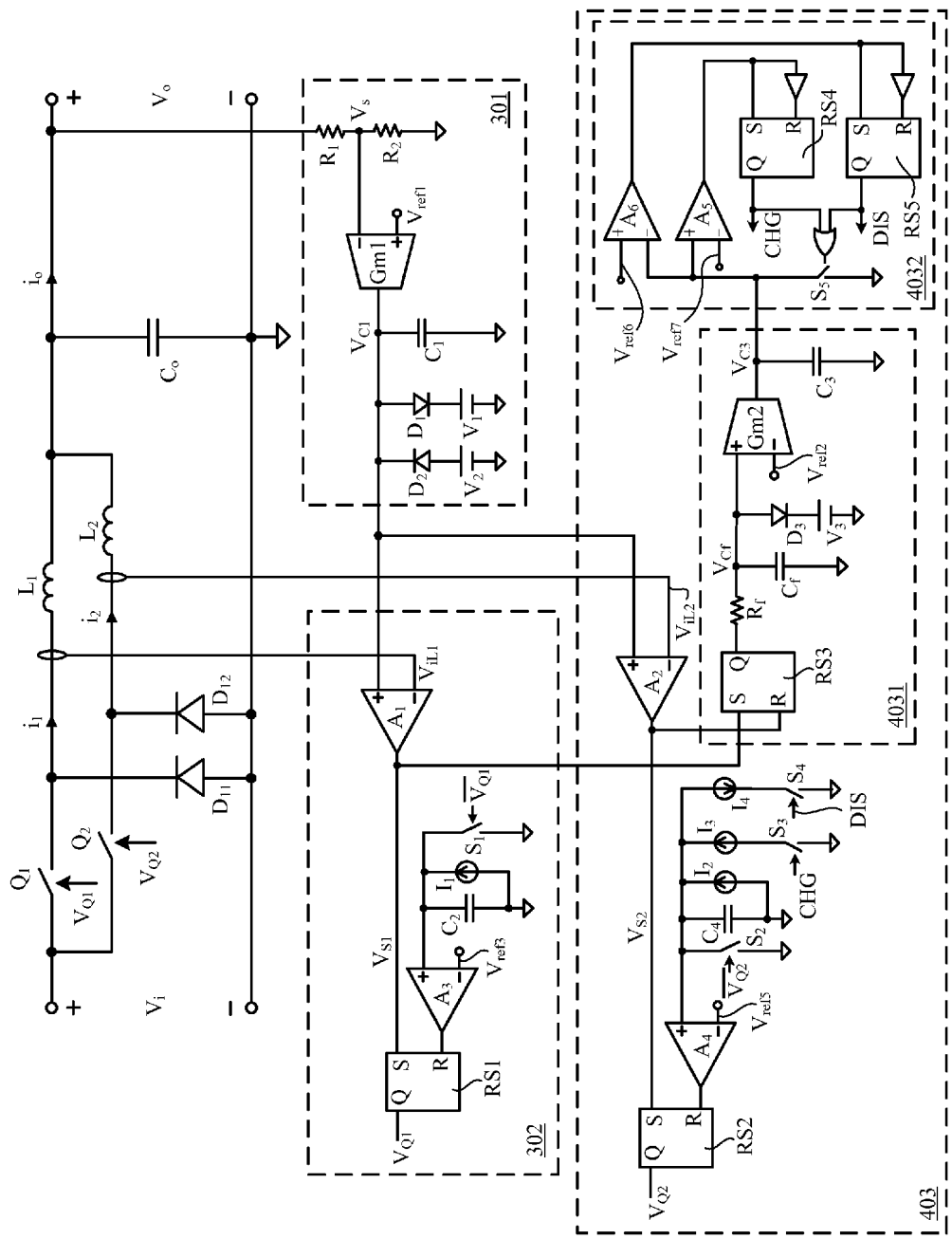
FIG. 3 is a schematic block diagram of a second example control circuit of an interleaved switching power supply, in accordance with embodiments of the present invention.

Referring now to FIG. 3, shown is a schematic block diagram of a second example control circuit of an interleaved switching power supply, in accordance with embodiments of the present invention. This example control circuit can include comparator $A_2$, phase difference judging circuit 4031, charging and discharging signal generation circuit 4032, a first current signal generation circuit, a second off signal generation circuit, and flip-flop RS2. Comparator $A_2$ can receive branch voltage signal $V_{iL2}$ representing the inductor current of the second voltage regulation circuit at the inverting input terminal, and feedback compensation signal $V_{C1}$ at the non-inverting input terminal. The second switch on signal can be generated at the output terminal of comparator $A_2$, to be provided to the set terminal of flip-flop RS2.

The phase difference judging circuit 4031 can receive the first switch on signal ($V_{S1}$) and the second switch on signal ($V_{S2}$), and may generate a voltage signal ($V_{C3}$) representing the phase difference between the two signals. Charging and discharging signal generation circuit 4032 can receive voltage signal $V_{C3}$. When voltage signal $V_{C3}$ is zero, charging and discharging signal generation circuit 4032 may be disabled. When voltage signal $V_{C3}$ increases, charging signal CHG may go high intermittently (e.g., periodically). When voltage signal $V_{C3}$ decreases, discharging signal DIS may go high intermittently.

The first current generation circuit can generate current signal $i_x$ (e.g., positively or negatively) in accordance with charging signal CHG and discharging signal DIS. The second off signal generation circuit can receive current signal $i_x$ and the control signal of main power switch $Q_2$. When the control signal of main power switch $Q_2$ is active, the time at which the second switch off signal generated by the second off signal generation circuit is provided to the reset terminal of flip-flop RS2 may be regulated by current signal $i_x$, in order to regulate the on time of main power switch $Q_2$.

The output terminal of flip-flop RS2 can generate the control signal of main power switch $Q_2$. When the second switch on signal is active, flip-flop RS2 may be set, and the control signal generated therefrom of main power switch $Q_2$ may be active to control main power switch $Q_2$ to be on. When the second switch off signal is active, flip-flop RS2 may be reset, and the control signal generated therefrom of second main power switch may be inactive to control main power switch $Q_2$ to be off. Charging and discharging signal generation circuit 4032 can include comparator $A_5$, comparator $A_6$, first and second buffers, flip-flop RS4, flip-flop RS5, an OR-gate, and switch $S_5$. Comparator $A_5$ can receive voltage signal $V_{C3}$ at its non-inverting input terminal, and reference voltage $V_{ref7}$ at the inverting input terminal, and can provide an output to the set terminal of flip-flop RS4 and the input of the first buffer.

Comparator $A_6$ can receive voltage signal $V_{C3}$ at the non-inverting input terminal, and reference voltage $V_{ref6}$ at the inverting input terminal, and the output terminal of which can connect to the set terminal of flip-flop RS5 and the input terminal of the second buffer. The output terminal of the first buffer can connect to the reset terminal of flip-flop RS4, and the output terminal of the second buffer can connect to the reset terminal of flip-flop RS5. The output terminal of flip-flop RS4 can connect to the first input terminal of the OR-gate, and can generate charging signal CHG. The output terminal of flip-flop RS5 can connect to the second input terminal of the OR-gate, and can generate discharging signal DIS. The output signal of the OR-gate can control switch $S_5$, which may be coupled between the output terminal of phase difference judging circuit 4031 and ground.

Charging and discharging signal generation circuit 4032 can receive voltage signal $V_{C3}$ representing a phase difference between signals $V_{S1}$ and $V_{S2}$. When voltage signal $V_{C3}$ is zero, the phase difference between signals $V_{S1}$ and $V_{S2}$, and also the phase difference between signals $V_{iL1}$ and $V_{iL2}$, may be about 180°, and charging and discharging signal generation circuit 4032 may be disabled. Thus, switches $S_3$ and $S_4$ can be off. The on time of main power switch $Q_1$ may be consistent with that of main power switch $Q_2$ through the matching of the following elements: $C_2=C_4$, $I_1=I_2$, and $V_{ref3}=V_{ref5}$. Also, the phase difference between the control signals of main power switches $Q_1$ and $Q_2$ can be controlled to be about 180° to achieve interleaved control mode.

When voltage signal $V_{C3}$ increases (e.g., continuously increases), the phase difference between signals $V_{S1}$ and $V_{S2}$ may be greater than 180°. When voltage signal $V_{C3}$ is greater than reference voltage $V_{ref7}$ (e.g., reference voltage $V_{ref7}$ can be slightly greater than zero), an output of comparator $A_5$ may be high to set flip-flop RS4, and signal CHG of flip-flop RS4 may also be high. Switch $S_3$ may be controlled to be on by signal CHG, and capacitor $C_4$ can be charged by current sources $I_2$ and $I_3$ to accelerate the charging of capacitor $C_4$. After a buffering time after signal CHG goes high, switch $S_5$ may be turned on to decrease the voltage across compensation capacitor $C_3$, and voltage signal $V_{C3}$ may be discharged zero.

Comparator $A_5$ can go low to reset flip-flop RS4, and charging signal CHG may go low to turn off switch $S_3$ again. Until voltage signal $V_{C3}$ reaches a value greater than reference voltage $V_{ref7}$ again, the above operation may be repeated. The time that capacitor $C_4$ may be charged to a level of reference voltage $V_{ref5}$ may be decreased by charging signal CHG to control the output signal of comparator $A_4$ to be high (in advance), as part of the adjustment. Then, flip-flop RS2 may be set, and output signal $V_{Q2}$ may go low to turn off main power switch $Q_2$ of the second voltage regulation circuit in advance), as part of the adjustment. The phase difference between branch voltage signals $V_{iL1}$ and $V_{iL2}$ may thus be adjusted/regulated to be about 180° for interleaved control.

When voltage signal $V_{C3}$ decreases, the phase difference between signals $V_{S1}$ and $V_{S2}$ may be less than about 180°. When voltage signal $V_{C3}$ is less than reference voltage $V_{ref6}$ (e.g., reference voltage $V_{ref6}$ is slightly less than zero), the output signal of comparator $A_6$ may be high to set flip-flop RS5, and output signal DIS of flip-flop RS5 may also be high. Switch $S_4$ may be controlled to be on by signal DIS, and capacitor $C_4$ can be charged by a current (e.g., the difference between current sources $I_2$ and $I_4$) to decelerate the charging of capacitor $C_4$. After a buffering time after signal DIS goes high, switch $S_5$ may be turned on to decrease the voltage across compensation capacitor $C_3$, and voltage signal $V_{C3}$ may be discharged to zero.

Comparator $A_6$ can go low to reset flip-flop RS5, and discharging signal DIS may go low to turn off switch $S_4$ again. Until voltage signal $V_{C3}$ reaches a value less than reference voltage $V_{ref6}$ again, the above operation may be repeated. The time that capacitor $C_4$ may be charged to a level of reference voltage $V_{ref5}$ may be increased by discharging signal DIS to control the output signal of comparator $A_4$ to be delayed to be high. Then, flip-flop RS2 may be set, and output signal $V_{Q2}$ may be delayed to be low to turn off main power switch $Q_2$ of the second voltage regulation circuit. The phase difference between branch voltage signals $V_{iL1}$ and $V_{iL2}$ may thus be adjusted/regulated to be 180° to achieve interleaved control.

In one embodiment, a method of controlling an interleaved switching power supply, can include: (i) sampling an output voltage of the interleaved switching power supply, and generating a feedback compensation signal; (ii) comparing a voltage signal representing an inductor current of a first voltage regulation circuit against the feedback compensation signal, and comparing a voltage signal representing an inductor current of a second voltage regulation circuit against the feedback compensation signal; (iii) generating a first switch on signal to turn on a main power switch of the first voltage regulation circuit when the voltage signal representing the inductor current of the first voltage regulation circuit is consistent with the feedback compensation signal, and generating a second switch on signal to turn on a main power switch of the second voltage regulation circuit when the voltage signal representing the inductor current of the second voltage regulation circuit is consistent with the feedback compensation signal; (iv) controlling the main power switch of the first voltage regulation circuit to be on for a predetermined time and then turning off the main power switch of the first voltage regulation circuit; and (v) adjusting an on time of the main power switch of the second voltage regulation circuit to regulate a phase difference between the first and second switch on signals to be 180° in response to the phase difference being detected as other than 180°.

Figure 4:
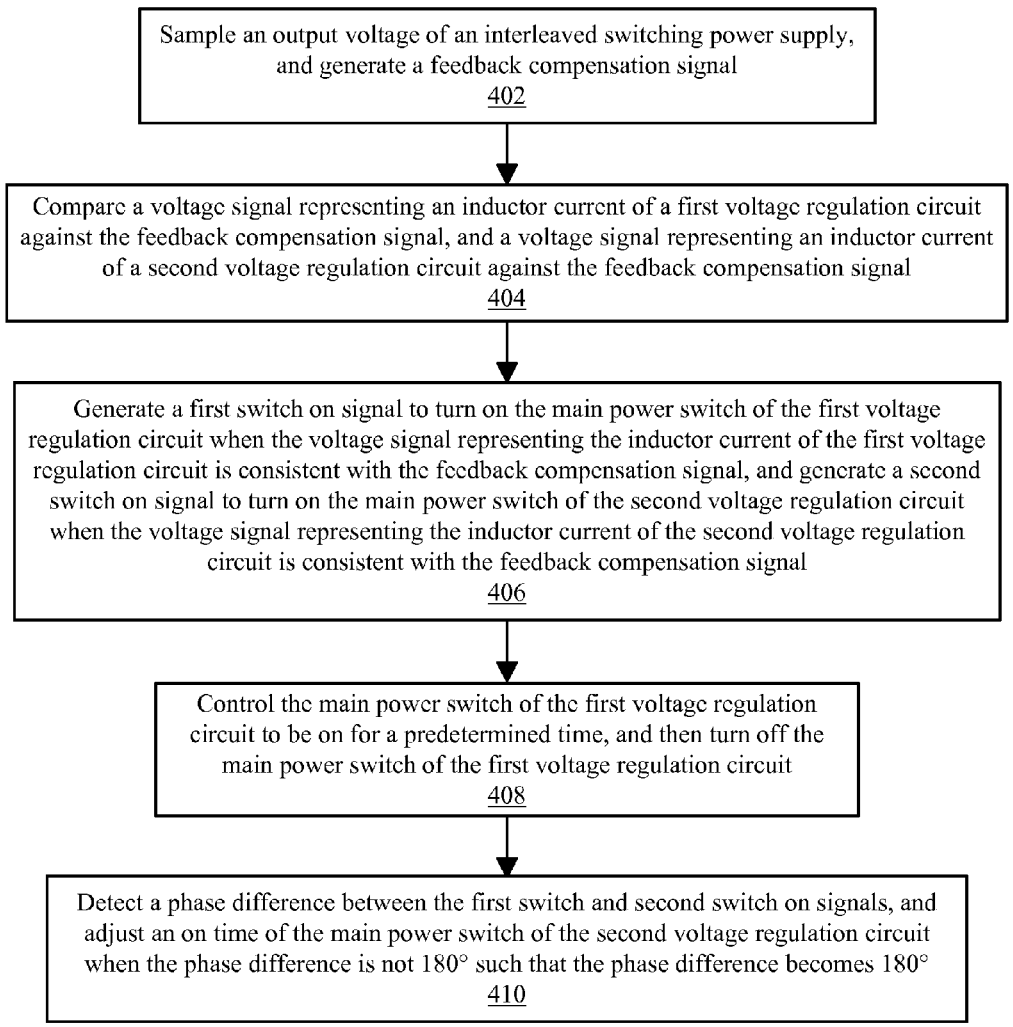
FIG. 4 is a flow diagram of an example method of controlling an interleaved switching power supply, in accordance with embodiments of the present invention.

Referring now to FIG. 4, shown is a flow diagram of an example method of controlling an interleaved switching power supply, in accordance with embodiments of the present invention. At 402, an output voltage (e.g., $V_o$) of an interleaved switching power supply can be sampled, and a feedback compensation signal can be generated (e.g., by comparing and/or compensating). At 404, a voltage signal (e.g., $V_{iL1}$) representing the inductor current of the first voltage regulation circuit can be compared against the feedback compensation signal (e.g., $V_{C1}$), and a voltage signal (e.g., $V_{iL2}$) representing the inductor current of the second voltage regulation circuit can be compared against the feedback compensation signal.

At 406, a first switch on signal (e.g., $V_{S1}$) can be generated to turn on the main power switch (e.g., $Q_1$) of the first voltage regulation circuit when the voltage signal representing the inductor current of the first voltage regulation circuit is consistent with (e.g., the same, or substantially the same level as) the feedback compensation signal. Also, a second switch on signal (e.g., $V_{S2}$) can be generated to turn on the main power switch (e.g., $Q_2$) of the second voltage regulation circuit when the voltage signal representing the inductor current of the second voltage regulation circuit is consistent with the feedback compensation signal.

At 408, the main power switch of the first voltage regulation circuit can be turned on for a predetermined time, and then turned off. At 410, a phase difference between the first and second switch on signals (e.g., $V_{S1}$ and $V_{S2}$) can be detected. The on time of the main power switch of the second voltage regulation circuit can be adjusted and/or regulated when the phase difference is not 180°, in order to turn off the main power switch of the second voltage regulation circuit. In addition, one or more of these steps can be repeated until a steady state is achieved, and the phase difference between the first and second switch on signals is controlled to be about 180°.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A control circuit configured for an interleaved switching power supply, the control circuit comprising:
   a) a feedback compensation signal generation circuit configured to sample an output voltage of said interleaved switching power supply, and to generate a feedback compensation signal;
   b) a first switch control circuit configured to compare a first branch voltage signal that represents an inductor current of a first voltage regulation circuit against said feedback compensation signal, wherein when said first branch voltage signal is consistent with said feedback compensation signal, a first switch on signal is generated to control a first main power switch of said first voltage regulation circuit to be on for a predetermined time, and then said first main power switch is controlled to be off; and
   c) a second switch control circuit configured to compare a second branch voltage signal that represents an inductor current of a second voltage regulation circuit against said feedback compensation signal, wherein when said second branch voltage signal is consistent with said feedback compensation signal, a second switch on signal is generated to control a second main power switch of said second voltage regulation circuit to be on, and wherein said second switch control circuit is configured to detect a phase difference between said first and second switch on signals, and to adjust an on time of said second main power switch to regulate said phase difference to be 180° in response to said phase difference being detected as other than 180°.

2. The control circuit of claim 1, wherein said first switch control circuit comprises:
 a) a first comparator configured to compare said first branch voltage signal against said feedback compensation signal at its non-inverting terminal, and to generate said first switch on signal;
 b) a first off signal generation circuit configured to receive a control signal of said first main power switch, and to generate a first switch off signal; and
 c) a first flip-flop configured to generate said control signal of said first main power switch, wherein said first flip-flop is set to control said first main power switch to be on when said first switch on signal is active, and said first flip-flop is reset to control said first main power switch to be off when said first switch off signal is active.

3. The control circuit of claim 2, wherein said first off signal generation circuit comprises:
 a) a first switch, a first current source, and a first capacitor coupled in parallel, wherein said first capacitor is charged by said first current source when said control signal of said first main power switch is active, and wherein a voltage across said first capacitor is zero when said control signal of said first main power switch is inactive; and
 b) a second comparator configured to activate said first switch off signal when said voltage across said first capacitor is consistent with a first reference voltage.

4. The control circuit of claim 2, wherein second switch control circuit comprises:
 a) a third comparator configured to receive said second branch voltage signal and said feedback compensation signal, and to generate said second switch on signal; and
 b) a phase difference judging circuit configured to generate a second voltage signal that represents a phase difference between said first and second switch on signals.

5. The control circuit of claim 4, wherein second switch control circuit comprises:
 a) a first current signal generation circuit configured to generate a first current signal in accordance with said second voltage signal;
 b) a second off signal generation circuit configured to receive said first current signal and a control signal of said second main power switch, wherein an on time of said second main power switch is regulated by said first current signal when said control signal of said second main power switch is active; and
 c) a second flip-flop configured to generate said control signal of said second main power switch, wherein said second flip-flop is set to control said second main power switch to be on when said second switch on signal is active, and wherein said second flip-flop is reset to control said second main power switch to be off when said second switch off signal is active.

6. The control circuit of claim 5, wherein second switch control circuit comprises a first transconductance operational amplifier configured to receive said second voltage signal, and to generate said first current signal.

7. The control circuit of claim 5, wherein said second switch control circuit comprises:
 a) a charging and discharging signal generation circuit configured to be disabled when said second voltage signal is zero;
 b) said charging and discharging signal generation circuit being configured to generate a charging signal that is intermittently high when said second voltage signal increases, and to generate a discharging signal that is intermittently high when said second voltage signal decreases; and
 c) wherein said first current signal is generated in accordance with said charging signal and said discharging signal.

8. The control circuit of claim 4, wherein said phase difference judging circuit comprises:
 a) a third flip-flop configured to receive said first switch on signal at a set terminal, and said second switch on signal at a reset terminal, and to generate a square wave signal that represents said phase difference between said first and second switch on signals;
 b) a low-pass filter configured to convert said square wave signal to a first voltage signal that represents said phase difference between said first and second switch on signals; and
 c) a second transconductance operational amplifier having an output coupled to a first compensation capacitor, wherein a voltage across said first compensation capacitor increases and said phase difference between said first and second switch on signals is greater than 180° when said first voltage signal is greater than said second reference voltage, and wherein said voltage across said first compensation capacitor decreases and said phase difference between said first and second switch on signals is less than 180° when said first voltage signal is less than said second reference voltage.

9. The control circuit of claim 5, wherein said second off signal generation circuit comprises a second switch, a second current source, and a second capacitor coupled in parallel, wherein said second capacitor is charged by said second current source when said control signal of said second main power switch is active, and wherein a voltage across said second capacitor is zero when said control signal of said second main power switch is inactive.

10. The control circuit of claim 7, wherein said charging and discharging signal generation circuit comprises:
 a) a fourth comparator configured to receive said second voltage signal and a third reference voltage, wherein an output of the fourth comparator is coupled to a set terminal of a fourth flip-flop and an input of a first buffer;
 b) a fifth comparator configured to receive said second voltage signal and a fourth reference voltage, wherein an output of the fifth comparator is coupled to a set terminal of a fifth flip-flop and an input of a second buffer;
 c) said fourth flip-flop having a reset terminal coupled to an output of said first buffer, said fifth flip-flop having a reset terminal coupled to an output of said second buffer; and
 d) an OR-gate configured to receive outputs from said fourth and fifth flip-flops, and to control a third switch that is coupled between said phase difference judging circuit and ground.

11. The control circuit of claim 1, wherein said feedback compensation signal generation circuit comprises:
 a) a sampling circuit configured to sample said output voltage of said interleaved switching power supply, and to generate a voltage sampling signal;
 b) a third transconductance operational amplifier configured to receive a first reference voltage and said voltage sampling signal; and
 c) a second compensation capacitor coupled between an output of said third transconductance operational amplifier and ground, wherein a voltage across said second compensation capacitor is configured as said feedback compensation signal.

12. A method of controlling an interleaved switching power supply, the method comprising:
  a) sampling an output voltage of said interleaved switching power supply, and generating a feedback compensation signal;
  b) comparing a voltage signal representing an inductor current of a first voltage regulation circuit against said feedback compensation signal, and comparing a voltage signal representing an inductor current of a second voltage regulation circuit against said feedback compensation signal;
  c) generating a first switch on signal to turn on a main power switch of said first voltage regulation circuit when said voltage signal representing said inductor current of said first voltage regulation circuit is consistent with said feedback compensation signal, and generating a second switch on signal to turn on a main power switch of said second voltage regulation circuit when said voltage signal representing said inductor current of said second voltage regulation circuit is consistent with said feedback compensation signal;
  d) controlling said main power switch of said first voltage regulation circuit to be on for a predetermined time and then turning off said main power switch of said first voltage regulation circuit; and
  e) adjusting an on time of said main power switch of said second voltage regulation circuit to regulate a phase difference between said first and second switch on signals to be 180° in response to said phase difference being detected as other than 180°.

* * * * *